Oct. 10, 1972    E. G. OBEDA    3,697,357
ULTRASONIC SEALING APPARATUS
Filed July 17, 1970                                        2 Sheets-Sheet 1
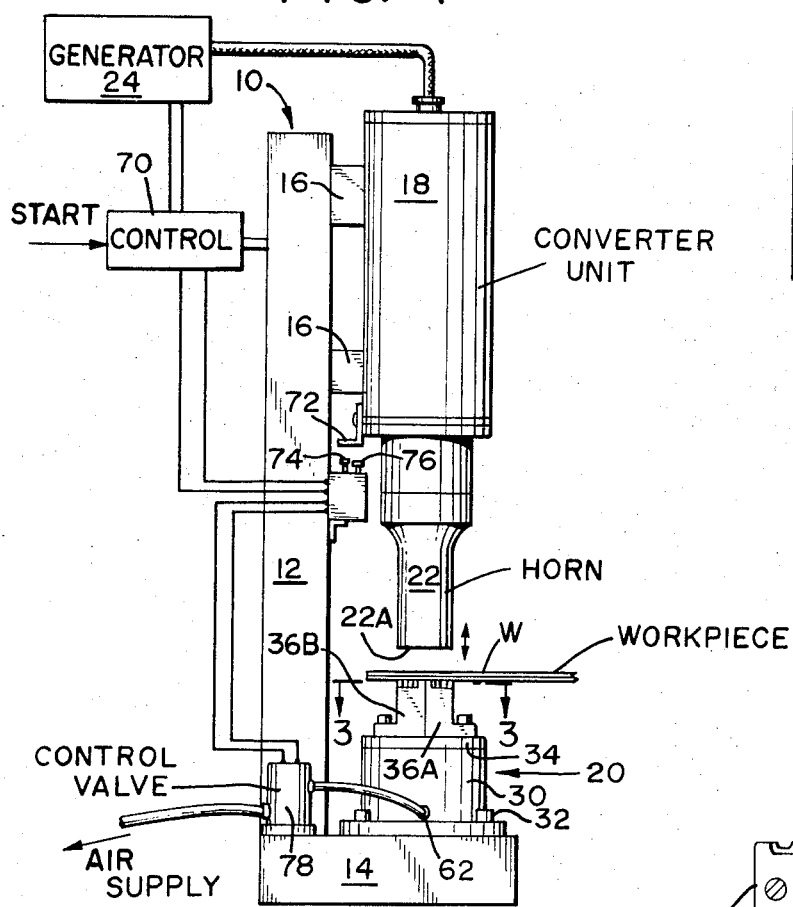
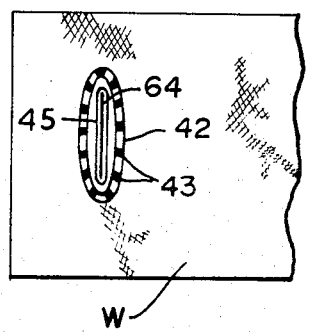
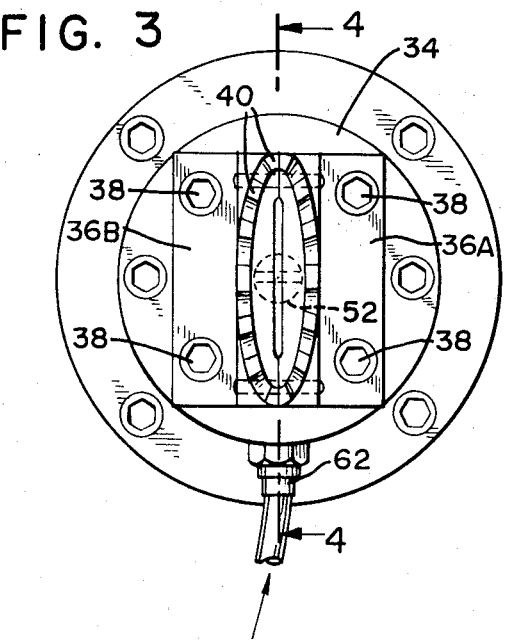
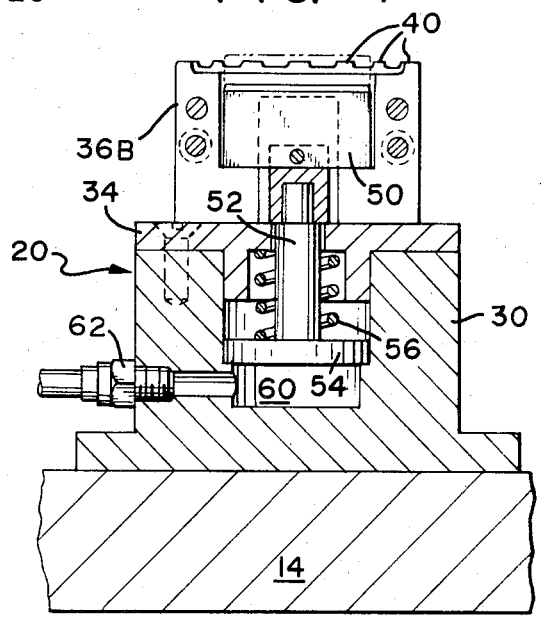
INVENTOR.
EDWARD G. OBEDA
BY:
Erwin B. Steinberg

United States Patent Office 3,697,357
Patented Oct. 10, 1972

3,697,357
ULTRASONIC SEALING APPARATUS
Edward G. Obeda, Brookfield, Conn., assignor to Branson Instruments, Incorporated, Stamford, Conn.
Filed July 17, 1970, Ser. No. 55,886
Int. Cl. B33b 31/00
U.S. Cl. 156—510    2 Claims

ABSTRACT OF THE DISCLOSURE

An ultrasonic buttonhole apparatus comprises an ultrasonic generator, a converter with horn, and a stationary anvil. The anvil is provided with a patterned face to cause a frame-like fused portion and with a movable slitting means which is raised during a portion of the sealing (weld) cycle, thereby causing selective fusing of the workpiece interposed.

---

This invention relates to ultrasonic sealing apparatus and more specifically has reference to a sealing apparatus for providing buttonholes in textile sheet material made partially or entirely of thermoplastic material or fiber.

Sealing or bonding of thermoplastic sheet material by ultrasonic energy is well known in the art, see for instance "Ultrasonic Engineering" (book) by Julian R. Frederick, John Wiley & Sons, New York, N.Y. (1965), pp. 190–192, or U.S. Pat. No. 2,633,894, issued to P. B. Carwile, dated Apr. 7, 1953, entitled "Plastic Welding."

Ultrasonic sealing is accomplished by disposing sheet material to be sealed between an anvil and an ultrasonic transducer or converter unit which is fitted with a solid horn, also called velocity transformer, mechanical amplitude transformer, tool, etc. The horn while being urged against the material and the underlying anvil is excited to be resonant at its natural mechanical frequency, generally 18 kHz. or higher. The high frequency energy in the form of mechanical vibration stresses the material, sometimes thought to manifest itself as molecular friction, and the resulting dissipation of energy causes a fusing of the thermoplastic material underneath the horn's frontal surface.

Recently non-woven textile materials have come into commerce which are partially or entirely made of thermoplastic material. These materials can be seamed by ultrasonic energy, using well established ultrasonic techniques. One of the further aspects in sewing a garment concerns the provision of a buttonhole. The present invention addresses itself to an apparatus for producing improved buttonholes using ultrasonic techniques, specifically, to the combination of an ultrasonic sealing and slitting device to provide in a single speedy operation a finished buttonhole which is characterized by a pleasing appearance and superior characteristic.

One of the principal objects of this invention is, therefore, the provision of a new and improved ultrasonic sealing apparatus for producing buttonholes in textile material.

Another important object of this invention is the provision of an ultrasonic sealing apparatus for providing buttonholes and including a slitting device having a controllable operating cycle.

A further salient object of this invention is the provision of an ultrasonic buttonhole apparatus especially suited for non-woven thermoplastic textile material and adapted to produce a buttonhole which is characterized by a pleasing appearance and superior wear characteristic.

Figure 5:
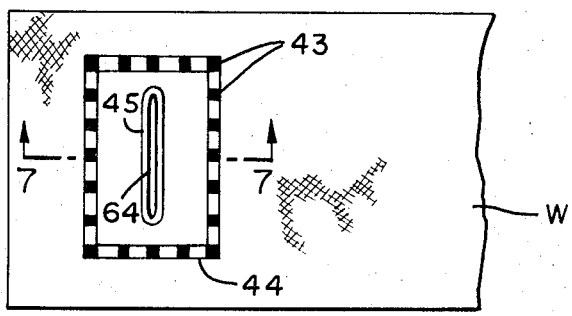
Figure 6:
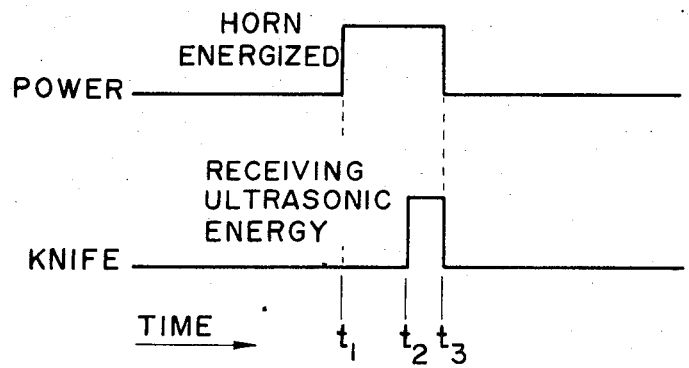
Figure 7:
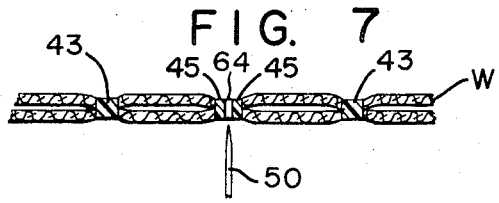

Further and still other objects of this invention will be more clearly apparent by reference to the following description when taken in conjunction with the accompanying drawing, in which:

FIG. 1 is a schematic elevational view of the ultrasonic apparatus;
FIG. 2 is a plan view of a typical buttonhole made in a textile material;
FIG. 3 is a plan view along line 3—3 in FIG. 1;
FIG. 4 is a sectional view along line 4—4 in FIG. 3;
FIG. 5 is a plan view of an alternative typical buttonhole made in a textile material;
FIG. 6 is a timing diagram, and
FIG. 7 is a sectional view along line 7—7 in FIG. 5.

CONSTRUCTION OF ULTRASONIC APPARATUS

Referring now to the figures and FIG. 1 in particular, numeral 10 refers to a stand having a vertical column 12 and a base 14. A mounting means 16 supports a converter unit 18 on the column. Responsive to the operation of motive means, not shown, the converter unit 18 is adapted to move toward engagement with an anvil structure 20, which will be described later, and to return to the raised position shown. The converter unit is fitted with a horn 22 made of aluminum, titanium or Monel. When energized with electrical high frequency energy from the generator 24, the converter unit 18 provides mechanical vibration to the horn 22 which is set into resonance along its longitudinal axis, exhibiting vibrations of increased amplitude at the frontal surface 22A. The converter unit includes either magnetostrictive or piezoeelectric means (not shown) to convert the electrical energy applied to mechanical output vibration and may be constructed in a preferred embodiment as disclosed in U.S. Pat. No. 3,328,610, issued to S. E. Jacke et al., entitled "Sonic Wave Generator," dated June 27, 1967.

The anvil mechanism includes a flanged base portion 30 bolted to the base 14 of the stand by screws 32 and also a top plate 34. A pair of top flanges 36A and 36B are screwed to the plate 34 by screws 38. The top or frontal surface of the flanges 36A and 36B is patterned as shown at 40 to exhibit raised and lowered surface portions which during the ultrasonic sealing process impress themselves on the workpiece W to cause fused and non-fused portions which are arranged, when viewed as a whole, in a frame-like outline as seen at 42 in FIG. 2. The outline may be in oval form as seen in FIGS. 2 and 3, or in a rectangular form 44 as seen in FIG. 5, to illustrate but two of a variety of possible shapes. The fused frame-like portion establishes essentially a pleasing pattern for the outline of the buttonhole and, if desired, fuses two superposed sheets to each other. As will be apparent, the raised and lowered portions 40 may be square elements, round or rectangular elements, or fanciful and ornamental configuration to suit the wishes of the designer.

The abutting flanges 36A and 36B provide a cavity in which there is disposed a razor-type knife blade 50 mounted to a vertical plunger rod 52 which, at its lower end, has fastened thereto a disk 54. A spring 56 encircles a portion of the plunger rod 52 and rests against the underside of the top plate 34. Upon pressurizing the chamber 60 via a fluid connector 62 and air supply (not shown), the disk 54, rod 52, and knife blade 50 are raised against the force provided by the spring 56. Raising the blade 50 causes a workpiece W supported between the horn and the frontal faces of flanges 36A and 36B to be slit as seen at 64 in FIGS. 2 and 5.

DESCRIPTION OF OPERATION

The operation of the foregoing apparatus may be described as follows: Material W in which a buttonhole is to be provided is placed on the anvil structure 20. Next, the operational cycle is started by providing a start signal to the control means 70. The control means causes the motive means (not shown) associated with the stand 10 to lower the converter unit 18 until the frontal surface 22A of the horn is urged into forced contact with the workpiece W. As the horn 22 is lowered upon the workpiece W, a bracket 72 attached to converter unit housing actuates a switch means 74 which is adapted to control via the control means 70 the electrical high frequency generator 24, thus applying power to the converter unit 18 for a predetermined time cycle, see FIG. 6. A brief moment thereafter, switch contact 76 is actuated which controls the valve 78 for pressurizing the chamber 60, thus raising the knife blade 50 and cutting the workpiece W to provide the slit 64 of the buttonhole.

While the horn is resonating at an ultrasonic frequency, in contact with the workpiece W and urged against the anvil, the dissipation of ultrasonic energy causes a fusing of the workpiece portions contacted by the horn. This provides the fused portions 43 within the frame-like outline indicated in FIGS. 2 and 5, see also FIG. 7. As previously explained, the exact spacing and form of the individually fused or sealed portions 43 is subject to individual preferences. As the knife blade is raised against the horn's frontal surface 22A (fusing or sealing occurs also among the edge of the cut, see numeral 45, FIG. 7. The sealing of the edge prevents fraying and unravelling of the material or fiber present, thereby reinforcing the hole. It should be noted that in the present construction the time cycle during which the blade is raised against the resonating horn is controllable and occurs during the time interval $t_2$–$t_3$ as illustrated in FIG. 6. The length of time cycle influences the amount of lateral fusing 45 occurring along the edge of the slit material. Generally, it may be stated that the fusing should be sufficient to prevent fraying of the material, but be not excessive to cause stiffening of the material and a weakened portion as is noted when an excessively large fused or melted area is created.

The entire buttonhole construction described hereinabove is characterized by an absence of stiffness and a lack of excessively large fused or sealed portions so characteristic of previously disclosed constructions. This novel feature is particularly important when using non-woven fabrics which usually are quite thick and fluffy. The present arrangement uses a controlled fusing or sealing process which may be adjusted to suit individual conditions and materials. To this end the flanges 36A and 36B are removably mounted and different flanges with new pattern means 40 may be put in place. Similarly, the duration of the cycle during which the knife blade is actuated and assumes its raised position is controllable, either by adjusting the position of the switch means 76 or, alternatively, using an electronic sequence timing device for the control means 70.

After the power transfer to the horn ceases, the horn may be retained for a brief dwell period in contact with the workpiece W to await the hardening of the fused material portions. Subsequently, the converter unit 18 is lifted and restored to its raised position. The entire cycle of making a buttonhole beginning with the lowering of the horn and terminating with the return of the horn to its raised portion usually takes from 1 to 2 seconds. It will be apparent, however, to those skilled in the art that this time indication is merely illustrative and no limitation shall be implied.

Instead of fluid pressure for raising the knife blade, in an alternative embodiment, an electrically operated solenoid may be used without deviating from the inventive concept disclosed.

What is claimed is:

1. Means for providing a buttonhole in textile cloth made entirely or partially of thermoplastic material or the like comprising:
    an anvil;
    a horn adapted to resonate when energized at an ultrasonic frequency;
    means for providing relative motion between said horn and said anvil for urging said horn and anvil toward each other and exerting thereby a compressive force upon the material interposed between said anvil and said horn;
    patterned means cooperating with said anvil and horn to cause a frame-like fused portion in the material when said material is interposed between said anvil and horn, and said horn is resonant at an ultrasonic freqency;
    movable slitting means disposed for providing a slit within said frame-like portion of said material;
    motive means coupled to said slitting means for moving said slitting means from a rest position to its actuated position engaging said horn;
    means for energizing said horn with ultrasonic energy, and
    control means coupled to said energizing means and said motive means for controlling the time cycle during which said horn is energized for transferring energy to said material and for moving said slitting means responsive to the position of said horn relative to said anvil from its rest position to its actuated position and retaining it in engagement with said horn during a portion of the cycle in which said horn is energized with ultrasonic energy for slitting the material and fusing the edge of the slit of the material as the result of ultrasonic energy provided by said horn.

2. Means for providing a buttonhole in textile cloth made entirely or partially of thermoplastic material or the like comprising:
    and anvil;
    a horn adapted to resonate when energized at an ultrasonic frequency;
    means for providing relative motion between said horn and said anvil for urging said horn and anvil toward each other and exerting thereby a compressive force upon the material interposed between said anvil and said horn;
    patterned means cooperating with said anvil and horn to cause a frame-like fused portion in the material when said material is interposed between said anvil and horn, and said horn is resonant at an ultrasonic frequency;
    a knife blade disposed within said anvil for providing a slit in said frame-like portion of said material;
    a plunger coupled to said blade for moving responsive to the application of pneumatic pressure said plunger from a rest position below the surface of said anvil to its actuated position engaging said horn;
    means for energizing said horn with ultrasonic energy, and
    control means coupled to said energizing means and said plunger for controlling the time cycle during which said horn is energized for transferring energy to said material and for moving said knife blade responsive to the position of said horn relative to said anvil from its rest position to its actuated position and retaining it in engagement with said horn during a portion of the cycle in which said horn is energized with ultrasonic energy for slitting the material and fusing the edge of the slit of the material as the result of ultrasonic energy provided by said horn.

References Cited

UNITED STATES PATENTS

| 3,565,732 | 2/1971 | Colianni | 156—513 |
| 2,414,157 | 1/1947 | Marziani | 156—513 |
| 3,423,271 | 1/1969 | Kallert et al. | 156—513 |
| 3,500,509 | 3/1970 | Moden | 156—253 |

DOUGLAS J. DRUMMOND, Primary Examiner

U.S. Cl. X.R.

156—580